(12) United States Patent
Tanimoto et al.

(10) Patent No.: US 9,490,625 B2
(45) Date of Patent: Nov. 8, 2016

(54) ELECTRONIC DEVICE AND VOLTAGE MONITORING METHOD

(71) Applicant: FUJITSU LIMITED, Kawasaki-shi, Kanagawa (JP)

(72) Inventors: Ryo Tanimoto, Tama (JP); Takahiko Yasuda, Kawasaki (JP); Masato Soga, Tokorozawa (JP)

(73) Assignee: FUJITSU LIMITED, Kawasaki (JP)

( * ) Notice: Subject to any disclaimer, the term of this patent is extended or adjusted under 35 U.S.C. 154(b) by 186 days.

(21) Appl. No.: 14/339,852

(22) Filed: Jul. 24, 2014

(65) Prior Publication Data
US 2015/0049407 A1    Feb. 19, 2015

(30) Foreign Application Priority Data

Aug. 14, 2013  (JP) ................. 2013-168744

(51) Int. Cl.
| | |
|---|---|
| *H02H 3/00* | (2006.01) |
| *H02H 3/44* | (2006.01) |
| *H04M 1/18* | (2006.01) |
| *H04M 1/725* | (2006.01) |

(52) U.S. Cl.
CPC ............. *H02H 3/44* (2013.01); *H04M 1/18* (2013.01); *H04M 1/72527* (2013.01)

(58) Field of Classification Search
CPC ........................................ H02H 3/44
USPC .................................................. 361/90
See application file for complete search history.

(56) References Cited

U.S. PATENT DOCUMENTS

| | | | |
|---|---|---|---|
| 6,904,488 B2* | 6/2005 | Matsumoto | G06F 13/4068 700/66 |
| 7,679,317 B2* | 3/2010 | Veselic | G06F 1/266 320/106 |
| 2010/0259399 A1 | 10/2010 | Tanno | |
| 2011/0050175 A1 | 3/2011 | Odaohhara et al. | |

FOREIGN PATENT DOCUMENTS

| | | |
|---|---|---|
| JP | 2004-235724 A | 8/2004 |
| JP | 2010-035036 A | 2/2010 |

OTHER PUBLICATIONS

EESR—Extended European Search Report dated Jan. 29, 2015, issued for European Patent Application No. / 14178920.6.

* cited by examiner

*Primary Examiner* — Stephen W Jackson
(74) *Attorney, Agent, or Firm* — Fujitsu Patent Center

(57) ABSTRACT

An electronic device includes a processor, and a connector used for connecting an external device to the electronic device, wherein the processor monitors fluctuation in a voltage at a specific terminal of the connector, and when the fluctuation in the voltage during a predetermined time period are not within a predetermined range, the processor electrically separates the connector.

5 Claims, 3 Drawing Sheets

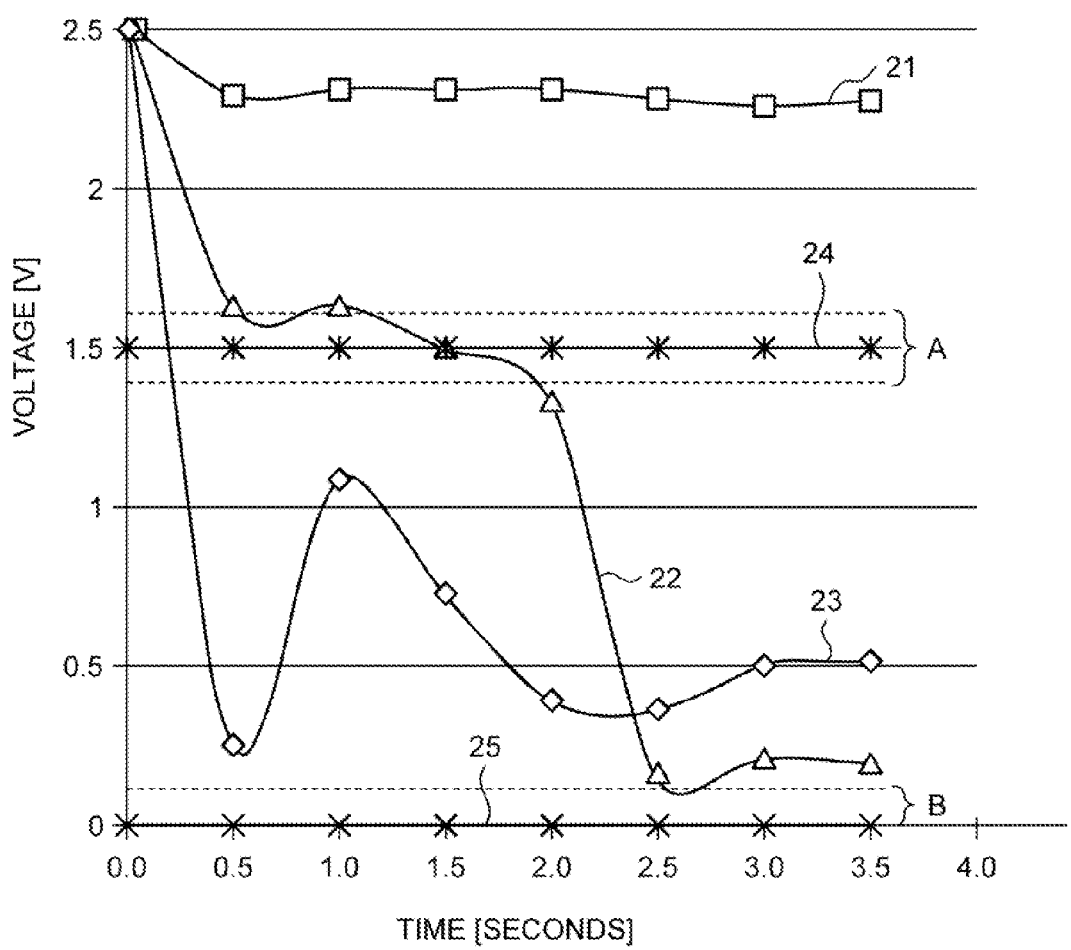

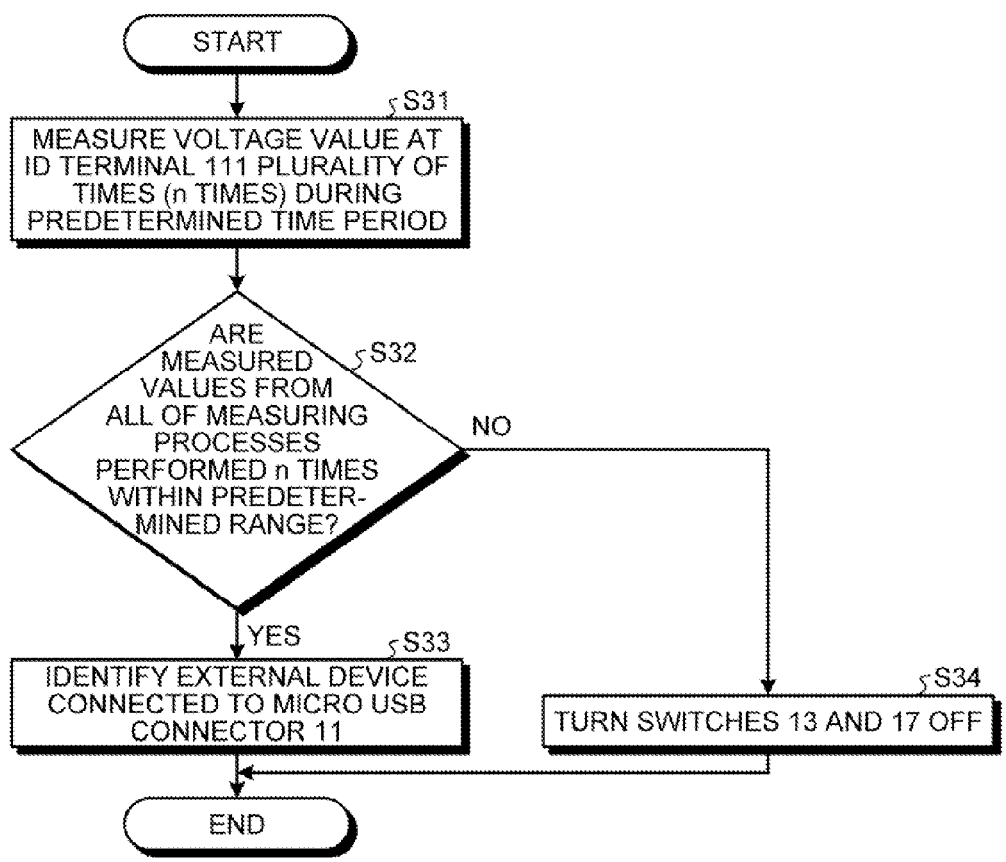

ELECTRONIC DEVICE AND VOLTAGE MONITORING METHOD

CROSS-REFERENCE TO RELATED APPLICATION

This application is based upon and claims the benefit of priority of the prior Japanese Patent Application No. 2013-168744, filed on Aug. 14, 2013, the entire contents of which are incorporated herein by reference.

FIELD

The embodiments discussed herein are related to an electronic device, a voltage monitoring method, and a voltage monitoring program.

BACKGROUND

As for a portable electronic device provided with a connector used for connecting an external device to the portable electronic device, when a charging device is connected to the connector while the connector is wet with water, a large amount of electric current (hereinafter, "current") flows into the portable electronic device, and a failure may occur in the electronic device. Thus, portable electronic devices are known with which a cap is provided for the opening of the connector, so as to prevent the connector from getting wet. However, the configuration where a cap is provided for the opening of the connector is troublesome.

To cope with these situations, as a first piece of related-art, a configuration is known by which the power supply to a circuit within a portable electronic device is stopped when the portable electronic device is detected to be in a wet state, so as to prevent failures of the portable electronic device, without having to provide a cap for the opening of a connector.

As a second piece of related-art, another configuration is also known in which a wet state of a portable electronic device is detected by detecting a short-circuit state of an existing terminal that is already provided in the portable electronic device, so as to be able to detect the wet state without having to enlarge the scale of the portable electronic device.

Some portable electronic devices that are recently on the market are provided with a connector (which hereinafter may be referred to as a "micro USB connector") that is compliant with the micro USB specification, as a connector used for connecting an external device to the portable electronic device. Examples of terminals which a micro USB connector may have include: an "ID terminal", a "ground terminal", a "VBUS terminal". The voltage value detected at the ID terminal fluctuates according to the resistance value of a connection terminal of an external device connected to the micro USB connector. Thus, the portable electronic device is able to identify the external device connected to the micro USB connector, according to the voltage value detected at the ID terminal. For example, the portable electronic device determines that an "external device A" is connected to the micro USB connector when the voltage value at the ID terminal is "X volts [V]", whereas the portable electronic device determines that an "external device B" is connected to the micro USB connector when the voltage value at the ID terminal is "Y [V]".

Related-art examples are described, for example, Japanese Laid-open Patent Publication No. 2004-235724 and Japanese Laid-open Patent Publication No. 2010-035036.

The voltage value at the ID terminal, however, not only fluctuates according to the external device connected to the micro USB connector, but also fluctuates when the micro USB connector gets wet with water. The reason is that a resistance value due to the water is generated between the ID terminal and the ground terminal when the micro USB connector gets wet with water. When the voltage value detected at the ID terminal when the micro USB connector is in a wet state happens to coincide with a voltage value corresponding to a specific external device, the portable electronic device mistakenly recognizes the wet state as a state where the specific external device is connected. Even when a charging device is connected as an external device while the micro USB connector is wet with water, when the portable electronic device is able to accurately detect the wet state, it will be possible to block the current flowing into the portable electronic device from the charging device. However, when the portable electronic device mistakenly recognizes the wet state as a state where a charging device is connected, a large amount of current will flow into the portable electronic device, and a failure may occur in the portable electronic device.

SUMMARY

According to an aspect of an embodiment, an electronic device includes a processor, and a connector used for connecting an external device to the electronic device, wherein the processor monitors fluctuation in a voltage at a specific terminal of the connector, and when the fluctuation in the voltage during a predetermined time period are not within a predetermined range, the processor electrically separates the connector.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a drawing for explaining operations of the electronic device according to the first embodiment; and FIG. 3 is a flowchart for explaining a process performed by the electronic device according to the first embodiment.

DESCRIPTION OF EMBODIMENTS

Figure 1:
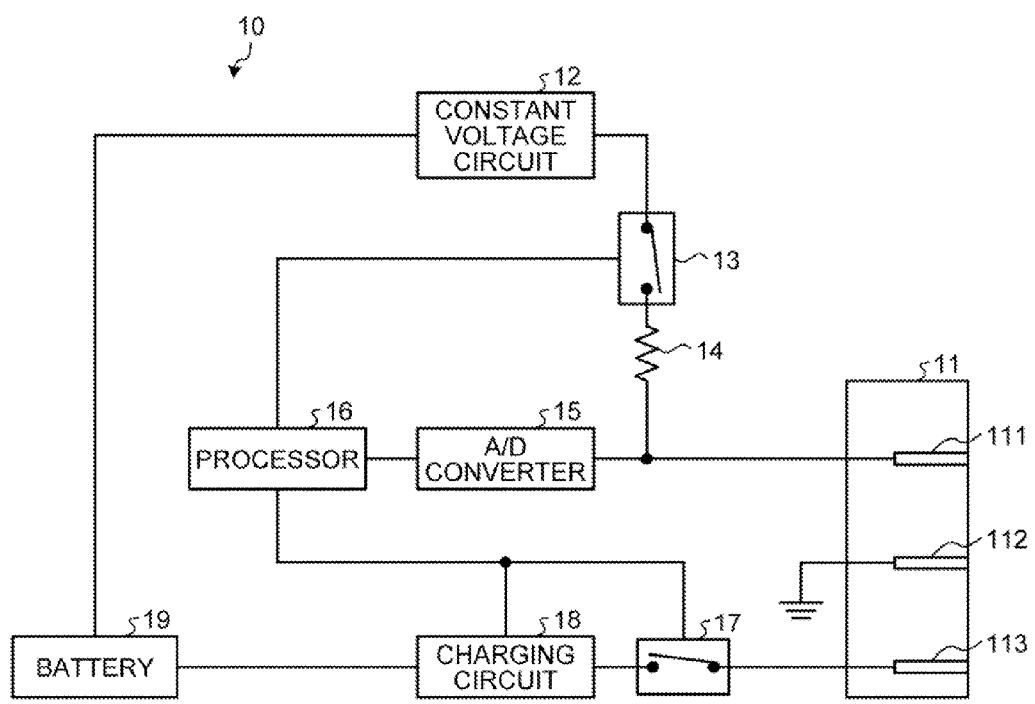
FIG. 1 is a diagram of an exemplary hardware configuration of an electronic device according to a first embodiment.

Preferred Embodiments of the Present Invention will be explained with reference to accompanying drawings.

The electronic device, the voltage monitoring method, and the voltage monitoring program of the present disclosure are not limited to the exemplary embodiments.

The electronic device of the present disclosure may be a portable electronic device such as a smartphone, a tablet terminal device, or the like or may be a stationary electronic device such as a desktop personal computer or the like.

[a] First Embodiment

A Hardware Configuration of the Electronic Device

FIG. 1 is a diagram of an exemplary hardware configuration of an electronic device according to a first embodiment. In FIG. 1, an electronic device 10 includes a micro USB connector 11, a constant voltage circuit 12, switches 13 and 17, a resistor 14, an analog/digital (A/D) converter 15, a processor 16, a charging circuit 18, and a battery 19. Further, the micro USB connector 11 includes an ID terminal 111, a ground terminal 112, and a VBUS terminal 113. The micro USB connector 11 is a connector used for connecting an external device to the electronic device 10. The ID terminal 111 is a terminal used for identifying an external device. The VBUS terminal 113 is a terminal used for charging the battery 19.

The constant voltage circuit 12 is connected to the ID terminal 111 via the switch 13 and the resistor 14. The constant voltage circuit 12 regulates the voltage supplied from the battery 19 so as to output a constant voltage. The constant voltage is supplied to the ID terminal 111 via the switch 13 and the resistor 14. For example, when the voltage supplied from the battery 19 fluctuates in the range from 3 to 4 volts [V] due to an influence of temperature or the like, the constant voltage circuit 12 outputs a constant voltage of 2.5 [V].

The voltage at the resistor 14, i.e., the voltage at the ID terminal 111 is input to the A/D converter 15. Thus, the A/D converter 15 detects an analog voltage value. The A/D converter 15 converts the detected analog voltage value into a digital voltage value and outputs the digital voltage value to the processor 16.

In this situation, when no external device is connected to the micro USB connector 11, the resistor 14 has, without any change, the output voltage of the constant voltage circuit 12. Accordingly, the output voltage value of the constant voltage circuit 12 is detected by the A/D converter 15, as the voltage value at the ID terminal 111.

In contrast, when an external device is connected to the micro USB connector 11, the output voltage of the constant voltage circuit 12 is divided according to the ratio between the resistance value of the resistor 14 and the resistance value of the connection terminal of the external device. Thus, the divided voltage value at the resistor 14 is detected by the A/D converter 15 as the voltage value at the ID terminal 111.

Further, when the micro USB connector 11 gets wet with water, a resistance component due to the water is generated between the ID terminal 111 and the ground terminal 112. Thus, the output voltage of the constant voltage circuit 12 is divided according to the ratio between the resistance value of the resistor 14 and the resistance value of the water. Accordingly, the divided voltage value at the resistor 14 is detected by the A/D converter 15 as the voltage value at the ID terminal 111.

The processor 16 controls the switches 13 and 17. Before an external device is connected to the micro USB connector 11, the processor 16 has the switches 13 and 17 turned on. After an external device is connected to the micro USB connector 11, the processor 16 exercises control to turn the switches 13 and 17 on and off, in accordance with the voltage value input thereto by the A/D converter 15, i.e., the voltage value at the ID terminal 111. Further, the processor 16 controls operations of the charging circuit 18. The control exercised by the processor 16 will be explained in detail later. Examples of the processor 16 include a Central Processing Unit (CPU), a Digital Signal Processor (DSP), and a Field Programmable Gate Array (FPGA).

The charging circuit 18 is connected to the VBUS terminal 113 via the switch 17. When a charging device is connected to the micro USB connector 11, the charging circuit 18 charges the battery 19 with the electric power supplied from the charging device via the VBUS terminal 113.

Operations of the Electronic Device

FIG. 2 is a drawing for explaining operations of the electronic device according to the first embodiment. In FIG. 2, the vertical axis expresses the voltage value at the resistor 14, i.e., the voltage value at the ID terminal 111. The horizontal axis expresses a period of time that has elapsed since an external device is connected to the micro USB connector 11.

Each of the measured results 21, 22, and 23 indicates fluctuation in the voltage that are observed when the micro USB connector 11 is wet with water. Each of the measured results 24 and 25 indicates fluctuation in the voltage that are observed when an external device is connected while the micro USB connector 11 is not wet with water.

When an external device is connected while the micro USB connector 11 is not wet with water, the voltage value at the ID terminal 111 exhibits a substantially constant value according to the resistance value of the connection terminal of the external device being connected, as indicated by the measured results 24 and 25. The resistance value of the connection terminal of the external device varies depending on the type of the external device. The range of variation in the resistance value is regulated by the Mobile Computing Promotion Consortium (MCPC) TR-014 specification, the CEA-936-A specification, a Battery Charging specification, or the like. Thus, for example, when the external device connected to the micro USB connector 11 is a charging device, the voltage value at the ID terminal 111 is substantially constant within a range A of 1.5±0.1 [V]. As another example, when the external device connected to the micro USB connector 11 is a USB memory, the voltage value at the ID terminal 111 is substantially constant within a range B of 0 to 0.1 [V].

In contrast, when the micro USB connector 11 is wet with water, the voltage value at the ID terminal 111 fluctuates over the course of time as indicated by the measured results 21, 22, and 23. The reason is that, because the ion concentration of the water that is in contact with the ID terminal 111 fluctuates over the course of time due to an influence of the voltage supplied to the ID terminal 111, the resistance value of the water fluctuates in accordance with fluctuation of the ion concentration. Further, the resistance value of the water is determined according to the state of the water such as the temperature of the water, the salinity concentration, the concentrations of other liquids contained in the water, and the concentration of impurities contained in the water. The voltage value at the ID terminal 111 is different for each of the measured results 21, 22, and 23, because the state of the water is also different for each of the measured results.

Accordingly, the processor 16 monitors fluctuation in the voltage at the ID terminal 111. Further, when the fluctuation in the voltage during a predetermined time period are within a predetermined range, the processor 16 determines that the micro USB connector 11 is not in a wet state and electrically connects the micro USB connector 11. Further, when the fluctuation in the voltage during the predetermined time period are within the predetermined range, the processor 16 identifies the external device connected to the micro USB connector 11. On the contrary, when the fluctuation in the voltage during the predetermined time period are not within the predetermined range, the processor 16 determines that either the micro USB connector 11 is in a wet state or an external device that is not compliant with the specifications is connected, and the processor 16 electrically separates the micro USB connector 11.

For example, as illustrated in FIG. 2, the processor 16 measures the voltage value at the ID terminal 111 eight times at intervals of 0.5 seconds between the time when the external device is connected to the micro USB connector 11 and 3.5 seconds later. Further, when all the eight measured values are either within the range A of 1.5±0.1 [V] or within the range B of 0 to 0.1 [V] as indicated by the measured results 24 and 25, the processor 16 keeps the switches 13 and 17 on. Further, when all the eight measured values are within the range A as indicated by the measured result 24, the processor 16 determines that the external device connected to the micro USB connector 11 is a charging device and causes the charging circuit 18 to operate. In contrast, when all the eight measured values are within the range B as indicated by the measured result 25, the processor 16 determines that the external device connected to the micro USB connector 11 is a USB memory.

On the contrary, when at least one of the eight measured values is neither within the range A nor within the range B, i.e., when the fluctuation in the voltage at the ID terminal 111 during the predetermined time period are not within the predetermined range, as indicated by the measured results 21, 22, and 23, the processor 16 turns the switches 13 and 17 off.

By turning the switch 17 off, because the current path between the VBUS terminal 113 and the charging circuit 18 is cut off, the processor 16 is able to arrange the switch 17 to block the current flowing into the electronic device 10 from the charging device via the VBUS terminal 113. As a result, even when the charging device is connected while the micro USB connector 11 is wet with water, it is possible to prevent a large amount of current from flowing into the electronic device 10. Thus, by electrically separating the micro USB connector 11 by turning the switch 17 off, it is possible to prevent failures of the electronic device 10 that may be caused by the micro USB connector 11 getting wet.

Further, when a voltage keeps being supplied to the ID terminal 111 while the ID terminal 111 remains wet with water, a chemical reaction is caused by the water on the ID terminal 111, and the ID terminal 111 may corrode. The corrosion of the ID terminal 111 is one of the factors that can cause a failure of the electronic device 10. To cope with this situation, by turning the switch 13 off, the processor 16 is able to arrange the switch 13 to block the voltage supplied to the ID terminal 111 from the constant voltage circuit 12. As a result, it is possible to prevent the ID terminal 111 from being corroded by being wet with water. Thus, by electrically separating the micro USB connector 11 by turning the switch 13 off, it is possible to prevent failures of the electronic device 10 that may be caused by the micro USB connector 11 getting wet.

A Process Performed by the Electronic Device

FIG. 3 is a flowchart for explaining a process performed by the electronic device according to the first embodiment.

When an external device is connected to the micro USB connector 11, the processor 16 monitors fluctuation in the voltage at the ID terminal 111, by measuring the voltage value at the ID terminal 111 plurality of times (n times) during a predetermined time period (step S31). For example, as illustrated in FIG. 2, the predetermined time period may be 3.5 seconds, while the number of times the measuring process is performed may be eight.

Subsequently, the processor 16 judges whether the measured values from all of the measuring processes performed n times is within a predetermined range (step S32). The predetermined range may be, for example, either the range A or the range B illustrated in FIG. 2.

After that, when all of the measured values from the measuring processes performed n times is within the predetermined range (step S32: Yes), the processor 16 identifies the external device connected to the micro USB connector 11 on the basis of the measured values (step S33).

On the contrary, when at least one of the measured values from the measuring processes performed n times is not within the predetermined range (step S32: No), the processor 16 turns the switches 13 and 17 off (step S34).

As explained above, according to the first embodiment, the processor 16 monitors the fluctuation in the voltage at the ID terminal 111 of the micro USB connector 11 in the electronic device 10. Further, when the fluctuation in the voltage at the ID terminal 111 during the predetermined time period are not within the predetermined range, the processor 16 electrically separates the micro USE connector 11.

When the fluctuation in the voltage during the predetermined time period are within the predetermined range, it is possible to determine that micro USB connector 11 is not in a wet state. On the contrary, when the fluctuation in the voltage during the predetermined time period are not within the predetermined range, there is a possibility that the micro USB connector 11 is in a wet state. Thus, by electrically separating the micro USB connector 11 when the fluctuation in the voltage during the predetermined time period are not within the predetermined range, it is possible to prevent failures of the electronic device 10 that may be caused by the micro USB connector 11 getting wet.

Further, the processor 16 electrically separates the micro USB connector 11 so as to block the inflow current from the external device connected to the micro USB connector 11.

Thus, even when a charging device is connected while the micro USB connector 11 is wet with water, it is possible to prevent a large amount of current from flowing into the electronic device 10. Consequently, it is possible to prevent failures of the electronic device 10 that may be caused by an inflow of a large amount of current. The inflow current from the external device is blocked as a result of the processor 16 turning the switch 17 off.

Further, the processor 16 electrically separates the micro USB connector 11 so as to stop the supply of the voltage to the ID terminal 111.

With this arrangement, it is possible to prevent the ID terminal 111 that is wet with water from corroding. Consequently, it is possible to prevent failures of the electronic device 10 that may be caused by corrosions of the ID terminal 111. The supply of the voltage to the ID terminal 111 is stopped as a result of the processor 16 turning the switch 13 off.

[b] Other Exemplary Embodiments (1) The processes described above performed by the processor 16 may be realized by causing the processor 16 to execute a computer program (hereinafter, "program") corresponding to the processes. For example, the program corresponding to the processes described above performed by the processor 16 may be stored in a memory (not depicted) included in the electronic device 10 so that the program is read from the memory and executed by the processor 16.

(2) In the exemplary embodiment described above, both the switches 13 and 17 are turned off in order to electrically separate the micro USB connector 11. However, another arrangement is also acceptable in which only one of the switches 13 and 17 is turned off in order to electrically separate the micro USB connector 11. When the switch 13 is turned off, the micro USB connector 11 is electrically separated at the ID terminal 111. In contrast, when the switch 17 is turned off, the micro USB connector 11 is electrically separated at the VBUS terminal 113.

(3) In the exemplary embodiment described above, the micro USB connector 11 is presented as an example of the connector used for connecting an external device. However, the connector used for connecting an external device does not necessarily have to be the micro USB connector 11. The connector used for connecting an external device may be any device as long as the device has at least either a terminal to which a constant level of voltage is supplied from the electronic device or a terminal used for charging the power for the electronic device.

According to an aspect of an embodiment of the present disclosure, it is possible to prevent the failures that may be caused by the connector getting wet.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An electronic device comprising:
   a processor; and
   a connector used for connecting an external device to the electronic device, wherein
   the processor:
      measures a plurality of voltage values at a specific terminal of the connector during a predetermined time period,
      electrically connects the connector when all of the plurality of measured voltage values are within a predetermined range, and
      electrically separates the connector when at least one of the plurality of measured voltage values is not within the predetermined range.

2. The electronic device according to claim 1, wherein the processor electrically separates the connector so as to block an inflow of electric current from the external device connected to the connector.

3. The electronic device according to claim 1, wherein the processor electrically separates the connector so as to stop a supply of a voltage to the specific terminal.

4. A voltage monitoring method implemented for an electronic device that includes a connector used for connecting an external device to the electronic device, the voltage monitoring method comprising:
   measuring a plurality of voltage values at a specific terminal of the connector during a predetermined time period;
   electrically connecting the connector when all of the plurality of measured voltage values are within a predetermined range; and
   electrically separating the connector when at least one of the plurality of measured voltage values is not within the predetermined range.

5. A computer-readable recording medium having stored therein a voltage monitoring program used by an electronic device that includes a processor and a connector used for connecting an external device to the electronic device, the voltage monitoring program causing the processor to execute:
   measuring a plurality of voltage values at a specific terminal of the connector during a predetermined time period;
   electrically connecting the connector when all of the plurality of measured voltage values are within a predetermined range; and
   electrically separating the connector when at least one of the plurality of measured voltage values is not within the predetermined range.

* * * * *